Patented July 7, 1925.

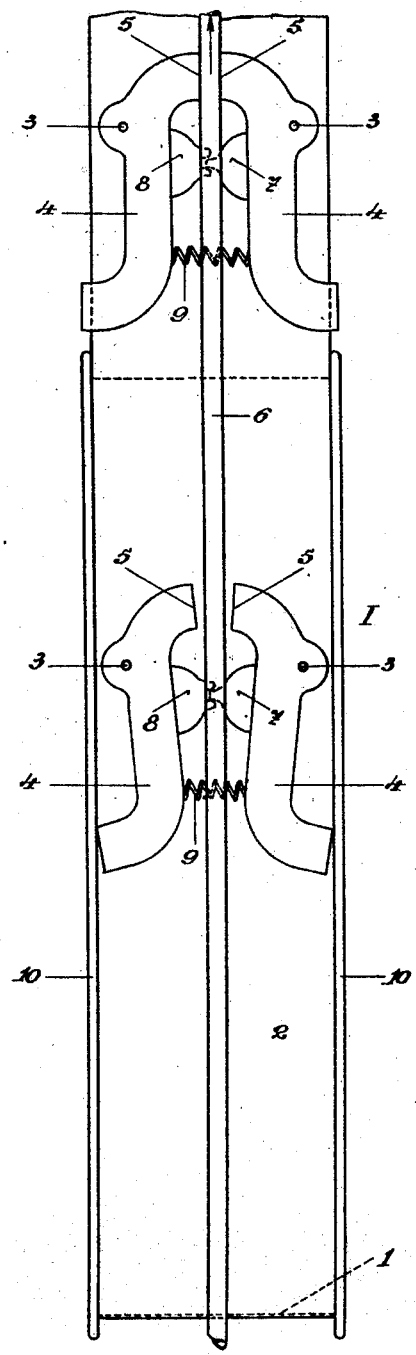

1,545,349

UNITED STATES PATENT OFFICE.

WALTER RIEDEL, OF UNTER-POLAUN, BOHEMIA, CZECHOSLOVAKIA.

MEANS FOR DRAWING HOT GLASS TO GLASS TUBES.

Application filed March 6, 1925. Serial No. 13,564.

*To all whom it may concern:*

Be it known that I, WALTER RIEDEL, a citizen of the Republic of Czechoslovakia, and residing at Unter-Polaun, Bohemia, Czechoslovakia, have invented certain new and useful Means for Drawing Hot Glass to Glass Tubes, of which the following is a specification.

For drawing hot glass metal to glass tubes an endless band is used, which runs over rollers and on which spring actuated gripping means are provided, which are capable of opening and closing to grip the work, draw it out and release it again. The invention concerns a particular construction of such pincer-like gripping means and consists substantially in this that the gripping members are positively connected to one another, such that the gripping jaws always set themselves so as to be symmetrical with respect to the drawing direction of the glass tube. By this means the glass tube to be drawn is always kept in the same direction, so that it cannot be damaged by being forced out of its path, as is possible in a known arrangement of this kind, in which only one of the gripping jaws moves away to one side from the glass tube and the other jaw. A further characteristic of the invention consists in this that the gripping jaws of the gripping members precede the pivotal point of the latter in the drawing direction. Consequently, for normal working a relatively slight spring pressure will suffice for establishing sufficient grip between the gripping face of the jaws and the work, while the gripping force automatically increases to the extent, to which the glass tube offers resistance to being drawn, so that it is no longer possible for the jaws to slip along the glass tube.

In the accompanying drawing a constructional example of the invention is shown diagrammatically.

Over a roller assumed to be at 1, but not shown in the drawing, there runs an endless band 2, on which the gripping members 4 are pivotally mounted on pins 3, the jaws 5 of which members are arranged so as to open and close symmetrically to the drawing direction of the work (glass tube) 6. For this purpose the gripping members 4 are connected together positively, for instance by a tooth 7 of one member engaging in a recess 8 of the other member.

The grip of the gripping jaws is brought about by the spring 9, which grip, when the work is being drawn in the direction shown in the drawing, increases automatically to the extent, to which the glass tube 6 offers resistance to being drawn, as this resistance tends to turn the jaws 5 inwardly and thereby increases the frictional pressure. The jaws of the gripping members are opened in a known manner before gripping the glass tube, by the gripping members sliding along guiding bars or the like 10 (see position 1 of the gripping members).

What I claim is:—

1. Means for the production of glass tubes by drawing, comprising in combination an endless band capable of travelling in one direction, gripping members mounted in pairs on the said band, so as to be capable of pivoting in the plane containing the axis of the glass tube, resilient means capable of coacting with the said gripping members for causing them to grip the tube, and gripping jaws on the said gripping members, which jaws lie in front of the pivotal points of the gripping members in the direction of travel of the said band, as and for the purpose set forth.

2. Means for the production of glass tubes by drawing, comprising in combination an endless band capable of travelling in one direction, gripping members mounted in pairs on the said band, so as to be capable of pivoting in the plane containing the axis of the glass tube, resilient means capable of coacting with the said gripping members for causing them to grip the tube, gripping jaws on the said gripping members, which jaws lie in front of the pivotal points of the gripping members in the direction of travel of the said band and interengaging abutments on the said gripping members, capable of rendering the position and motion of the gripping members symmetrical with respect to the glass tube, as set forth.

In testimony whereof I have signed my name to this specification.

WALTER RIEDEL.

Witnesses:
FRANZ KLANKCHILD,
JANE LOUIE.